United States Patent
Li et al.

(10) Patent No.: US 9,699,809 B2
(45) Date of Patent: Jul. 4, 2017

(54) SEMI-PERSISTENT RESOURCE ALLOCATION OF SMALL PACKET TRANSMISSION

(71) Applicant: NOKIA CORPORATION, Espoo (FI)

(72) Inventors: Zexian Li, Espoo (FI); Osman Yilmaz, Helsinki (FI); Mikko A. Uusitalo, Helsinki (FI); Marttti Moisio, Vantaa (FI); Ilkka Keskitalo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 213 days.

(21) Appl. No.: 14/158,966

(22) Filed: Jan. 20, 2014

(65) Prior Publication Data

US 2015/0208350 A1 Jul. 23, 2015

(51) Int. Cl.
*H04W 74/02* (2009.01)
*H04W 52/02* (2009.01)
*H04W 74/04* (2009.01)
*H04W 4/00* (2009.01)
*H04W 4/02* (2009.01)
*H04W 64/00* (2009.01)
*H04W 72/04* (2009.01)
(Continued)

(52) U.S. Cl.
CPC ........... *H04W 74/02* (2013.01); *H04W 4/005* (2013.01); *H04W 4/02* (2013.01); *H04W 52/0216* (2013.01); *H04W 52/0254* (2013.01); *H04W 64/006* (2013.01); *H04W 72/048* (2013.01); *H04W 72/0446* (2013.01); *H04W 74/04* (2013.01); *H04W 74/0833* (2013.01); *H04W 88/10* (2013.01); *Y02B 60/50* (2013.01)

(58) Field of Classification Search
CPC . H04W 74/02; H04W 74/04; H04W 74/0833; H04W 72/048; H04W 72/0446; H04W 52/0254; H04W 52/0216; H04W 64/006; H04W 4/005; H04W 4/02; H04W 88/10; Y02B 60/50
See application file for complete search history.

(56) References Cited

U.S. PATENT DOCUMENTS

2009/0196366 A1* 8/2009 Shen ............... H04L 5/0053 375/260
2011/0111784 A1 5/2011 Seo. et al.
(Continued)

OTHER PUBLICATIONS

Ericsson Research, "Machine to Machine (M2M) communications—Part 1", Basis & Challenges, Seminars in Signals, Sensors & Systems, Feb. 27, 2013, pp. 1-27.
(Continued)

*Primary Examiner* — Joshua Kading
(74) *Attorney, Agent, or Firm* — Squire Patton Boggs (US LLP)

(57) ABSTRACT

Various communication systems may benefit from power efficiency. For example, certain communication systems associated with the long term evolution (LTE) of the third generation partnership project (3GPP) may benefit from methods and devices for providing power efficient support of small packet transmission. A method can include determining whether a position of a device is static. The method can also include, when the position of the device is determined to be static, allocating at least one semi-persistent resource for a time when the device is in an idle state.

20 Claims, 8 Drawing Sheets

(51) Int. Cl.
*H04W 74/08* (2009.01)
*H04W 88/10* (2009.01)

(56) References Cited

U.S. PATENT DOCUMENTS

| | | | |
|---|---|---|---|
| 2011/0274040 A1 | 11/2011 | Pani et al. | |
| 2012/0208545 A1 | 8/2012 | Yang et al. | |
| 2013/0083753 A1* | 4/2013 | Lee | H04W 72/0453 370/329 |
| 2013/0122927 A1 | 5/2013 | Hu | |
| 2014/0087721 A1* | 3/2014 | Dimou | H04W 24/02 455/423 |
| 2014/0313908 A1* | 10/2014 | da Silva | H04W 4/005 370/252 |
| 2015/0124775 A1* | 5/2015 | Guo | H04W 8/005 370/331 |

OTHER PUBLICATIONS

European Search Report Application No. 14194651.7 dated May 29, 2015.

* cited by examiner

SEMI-PERSISTENT RESOURCE ALLOCATION OF SMALL PACKET TRANSMISSION

BACKGROUND

Field

Various communication systems may benefit from power efficiency. For example, certain communication systems associated with the long term evolution (LTE) of the third generation partnership project (3GPP) may benefit from methods and devices for providing power efficient support of small packet transmission.

Description of the Related Art

Machine-to-Machine (M2M) communication technologies are rapidly gaining attention from the telecommunication industry and have recently been deployed in smart grid, home networking, health care, and vehicular networking environments. One of the six horizontal topics studied in Mobile and wireless communications Enablers for the Twenty-twenty Information Society (METIS) is massive machine communications (MMC). M2M is recognized as an important part of the future 5G systems.

Considering the major use case of M2M, one of the clear characteristic aspects is small packet transmission in a very infrequent manner. Power consumption is an element for consideration when designing solutions for M2M communication.

Currently in 3GPP, there is ongoing work on the machine-type communication (MTC). So far the work in 3GPP has mainly focused on the MTC enhancements for Rel-12. However, 3GPP systems are not designed for MTC operation with small packet transmission.

SUMMARY

According to certain embodiments, a method can include determining whether a position of a device is static. The method can also include, when the position of the device is determined to be static, allocating at least one semi-persistent resource for a time when the device is in an idle state.

In certain embodiments, a method can include receiving an allocation of at least one semi-persistent resource for a time when a device is in an idle state. The method can also include using the at least one semi-persistent resource when the device is in an idle state.

An apparatus can, according to certain embodiments, include at least one processor and at least one memory including computer program code. The at least one memory and the computer program code can be configured to, with the at least one processor, cause the apparatus at least to determine whether a position of a device is static. The at least one memory and the computer program code can also be configured to, with the at least one processor, cause the apparatus at least to, when the position of the device is determined to be static, allocate at least one semi-persistent resource for a time when the device is in an idle state.

An apparatus can, in certain embodiments, include at least one processor and at least one memory including computer program code. The at least one memory and the computer program code can be configured to, with the at least one processor, cause the apparatus at least to receive an allocation of at least one semi-persistent resource for a time when a device is in an idle state. The at least one memory and the computer program code can also be configured to, with the at least one processor, cause the apparatus at least to use the at least one semi-persistent resource when the device is in an idle state.

According to certain embodiments, an apparatus can include means for determining whether a position of a device is static. The apparatus can also include means for, when the position of the device is determined to be static, allocating at least one semi-persistent resource for a time when the device is in an idle state.

In certain embodiments, an apparatus can include means for receiving an allocation of at least one semi-persistent resource for a time when a device is in an idle state. The apparatus can also include means for using the at least one semi-persistent resource when the device is in an idle state.

A non-transitory computer readable medium can, in certain embodiments, be encoded with instructions that, when executed in hardware, perform a process. The process can include determining whether a position of a device is static. The process can also include, when the position of the device is determined to be static, allocating at least one semi-persistent resource for a time when the device is in an idle state.

A non-transitory computer readable medium can, in certain embodiments, be encoded with instructions that, when executed in hardware, perform a process. The process can include receiving an allocation of at least one semi-persistent resource for a time when a device is in an idle state. The process can also include using the at least one semi-persistent resource when the device is in an idle state.

BRIEF DESCRIPTION OF THE DRAWINGS

For proper understanding of the invention, reference should be made to the accompanying drawings, wherein.

DETAILED DESCRIPTION

Figure 1:
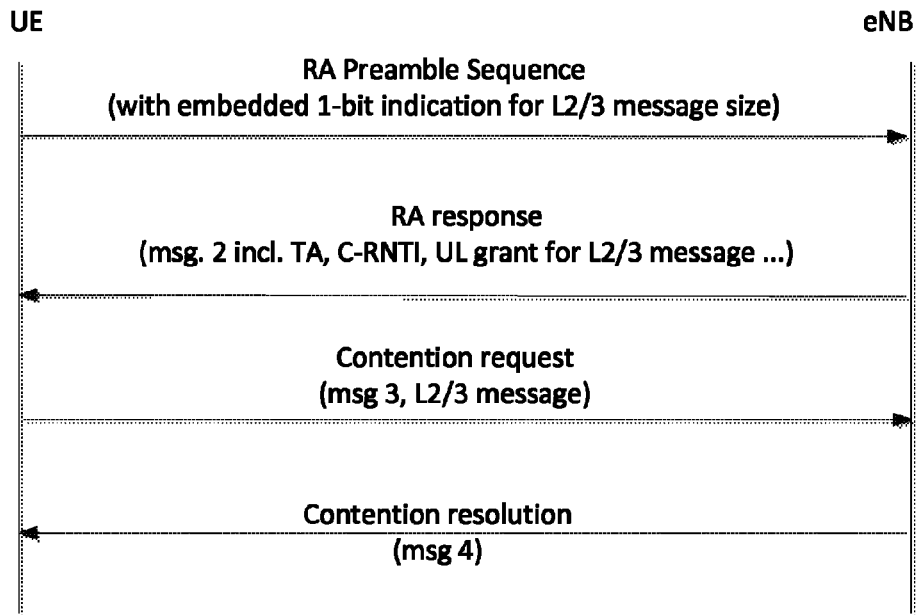
FIG. 1 illustrates a contention-based random access procedure according to certain embodiments.

Certain embodiments enhance or extend third generation partnership project (3GPP) or other procedures to efficiently support small packet transmission.

The ongoing work in Rel-12 has focused on the possibility for device-side half-duplex operation, reduced requirements on maximum supported peak data-rate requirements and reduced requirements on maximum supported bandwidths, such as less than 20 MHz. However, conventional LTE technology is not sufficient to handle MMC type of communication according to the conventional requirements for power, cost and resource usage. For example, conventionally a UE has to enter into RRC_Connected mode before transmitting any packet data, no matter whether the packet is large or small. Furthermore, if data packets are not transmitted frequently, for example, every hour, the sensor device conventionally has to follow the specified procedure in LTE for even small packet transmission leading to additional signaling overhead. Thus, by contrast, certain embodiments can provide an LTE-based approach to efficiently support infrequent small packet transmission.

Thus, certain embodiments may enable small packet data transmission in a power efficient manner. More specifically, in certain embodiments an MTC UE can be kept in RRC_Idle mode as long as possible. For moving MTC UEs, instead of entering RRC_Connected mode for small packet transmission, an extended random access channel (RACH) procedure can be utilized for small data transmission.

In particular, certain embodiments provide resource allocation for static UE or relative static UE. An example of a relative static UE may be where a UE and a connected eNB are moving at the same speed and direction for example vehicle eNB. In such a case resource allocation for MTC UE can be provided in a semi-persistent way even when the UE stays in RRC_Idle mode. In particular, there may be resources which can be used for UEs in RRC_Idle mode. For instance, these resources (for example, in terms of time, frequency, and/or code or other domain) can be informed before/when UE goes to the idle mode. Moreover, as an option, the given resources can only be valid for certain sensors, such as, for example static UEs.

When the RRC_Idle MTC device is moving, an extended random access (RA) procedure for small data transmission can use a different packet structure for small data transmission. This procedure can also be applied when updating the tracking area. In certain embodiments, simple acknowledgement of successful packet data reception by the base station can be provided without introducing much overhead. For example, such acknowledgment can be associated with a successful RA procedure.

Certain embodiments provide for transmission timing determination. For example, if there is no mobility, even an RRC_Idle mode UE can use the same timing advance (TA) value as the TA value before entering RRC_Idle mode. In this discussion, mobility includes reference to physical movement of the device, even if there are no handovers. For example, a UE may be in a no mobility case when it has no physical movement, almost no physical movement, or no physical movement relative to a reference point. In case of mobility, TA can be estimated based on information of new location and location of the base station in cases when location is available. Location can be received in some known locations and then in later phases calculated based on sensed movement. In case the UE is transmitting small packet data with extended RACH, an extended CP with the available DL timing reference can be used for data transmission.

Certain embodiments address the issue of user equipment identification (UE ID). For example, for static MTC UE, the location can be used as the UE identity. In some cases, the UE ID may not really be necessary. For moving MTC UE, the UE ID could be for example, a static IP address, a system architecture evolution (SAE) temporary mobile subscriber identity (S-TMSI), medium access control (MAC) address, type of the sensor or any context information that is associated with the sensor and known by the network (NW). To support secured data delivery or for other reasons, a database for the keys of each sensor can exist for example in eNB or one or more database(s). When listening, if the sensor ID is known, the receiver can access the key from database(s).

Various detailed implementations are possible, of which the following examples are illustrations.

Semi-persistent resource allocation for static or relative static user equipment (UE) in RRC_Idle state can be done in various ways. For example, resource allocation for an MTC UE can be made in a semi-static way even when the UE stays in RRC_Idle mode. To be more specific, before the UE enters RRC_Idle state, the UE can inform the network of the traffic pattern. For example, the UE can inform the network of conditions for after the UE enters RRC_Idle state, such as quality of service (QoS) requirements, periodicity, message size, and the like. For MTC devices, this information can be known by the UE beforehand. For example, a UE that is configured as an environmental sensor may report temperature, humidity, and the like at regular intervals. According to the traffic pattern, the eNB can allocate corresponding resources to the MTC UE. The allocation can be valid even after the MTC UE enters RRC_Idle state.

Since the MTC UE may be in the same position, due to no mobility or no mobility relative to an access point, the same transmitting timing advance value can be applied for small packet transmission. In this way, the MTC UE can transmit small packets periodically without entering RRC-_Connected mode.

There are at least two ways for a network element, such as a base station, to determine whether a UE is in a stationary configuration. One way is to provide explicit or implicit signaling from the UE to indicate that the UE is stationary. Alternatively, during installation of certain UEs, for example sensors, the operator can already know that the UE is stationary. In certain embodiments it is not necessary for the NW to know whether the UE is static or not. Moreover, for example, if the UE is sending out semi-persistent resource allocation, the eNB can assume that the UE is a static UE.

Certain embodiments can also provide an extended random access procedure for small packet transmission for, for example, moving MTC UEs. If the MTC UE is not static, semi-persistent resource allocation across the tracking area may bring inefficient resource usage if the same resource is reserved over the whole tracking area. According to current specified RA procedure, it is possible for the UE to include a small amount data in message 3. Thus, this message can be used for the MTC device to transmit a small amount of data, as shown in FIG. 1.

FIG. 1 illustrates a contention-based random access procedure according to certain embodiments. As shown in FIG. 1, a first message can be a random access (RA) preamble sequence with an embedded 1-bit indication for L2/3 message size. The RA preamble sequence can be sent from a user equipment to an access point, such as an evolved Node B (eNB).

Message 2 can be an RA response from the eNB to a UE. The RA response can include timing advance (TA), cell radio network temporary identifier (C-RNTI), and uplink (UL) grant for an L2/L3 message, as well as other information.

Message 3 can be a contention request from the UE to the eNB. This message can contain the L2/3 message, as mentioned above. Finally, the eNB can send message 4 to the UE. The message can be a contention resolution.

However, with the massive deployment of MTC devices, collision probability will be increased significantly and result in increased access latency for both initial access to NW and also switching time from RRC_Idle to RRC_Connected state. Accordingly, in contrast to FIG. 1, certain embodiments define a new packet structure in LTE and define a new type of random access for infrequent small packet transmission, which can used in an extended random access procedure, such as that illustrated in FIG. 5. More specifically, the new packet structure can be RA preamble sequence followed by small packet. The new packet structure could be, for example, as simple as shown in FIG. 2.

Figure 2:
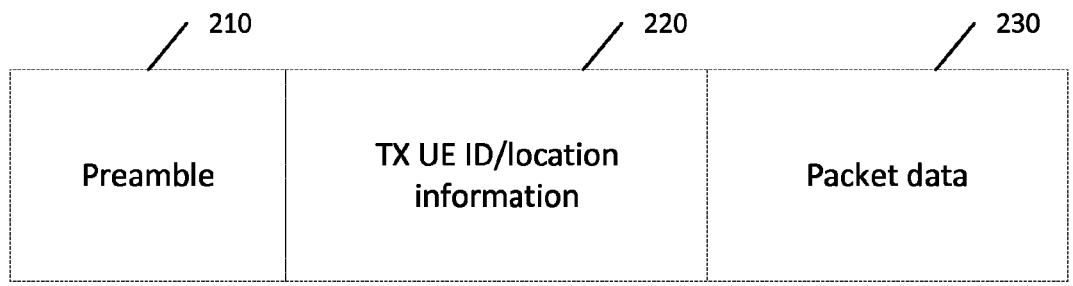
FIG. 2 illustrates a packet structure according to certain embodiments.
Figure 5:
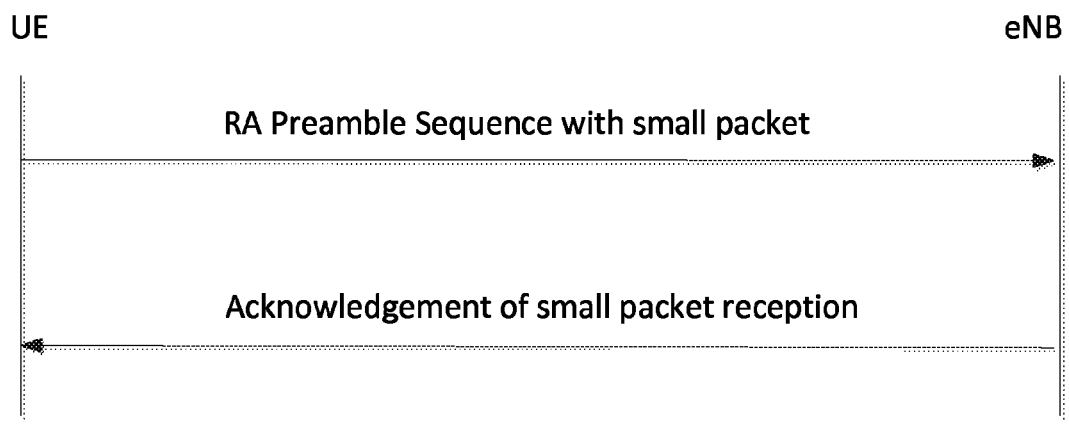
FIG. 5 illustrates an extended random access procedure for small packet transmission, according to certain embodiments.

FIG. 2 illustrates a packet structure according to certain embodiments, which can be used in an extended random access procedure as illustrated in FIG. 5 and discussed below. As shown in FIG. 2, the packet structure can include a preamble 210, transmitting (TX) UE ID and/or location information 220, and packet data 230.

The preamble 210 can be used for the purpose of channel estimation. If the preamble 210 sequence is UE specific, there may be no need to include UE ID 220 in the packet.

The random access preamble sequence for small packet transmission can be newly defined or can be based on a new set that is divided based on the current RA preamble sequences. Depending on the deployment scenarios, the configuration of the preamble sequences (for example, number of RA preamble sequences for small packet transmission) can be dynamically controlled by the network (NW).

In the packet data part 230, depending on the reported data, the packet structure can be different. For example, in case of reporting temperature, it might be enough to include the geographical location information and temperature value. With the newly introduced packet structure, the small packet can be transmitted in the first step of random access procedure.

Non-contention based access may also be possible, so that the category or type corresponding to a high priority sensor can get a UE specific preamble. No UE ID may be needed in the message part, due to the UE-specific preamble sequences.

In order to support the extended RA procedure or for other reasons, more resource can be reserved for small packet transmission. Different zones/partitions can be defined as shown in FIG. 3.

Figure 3:
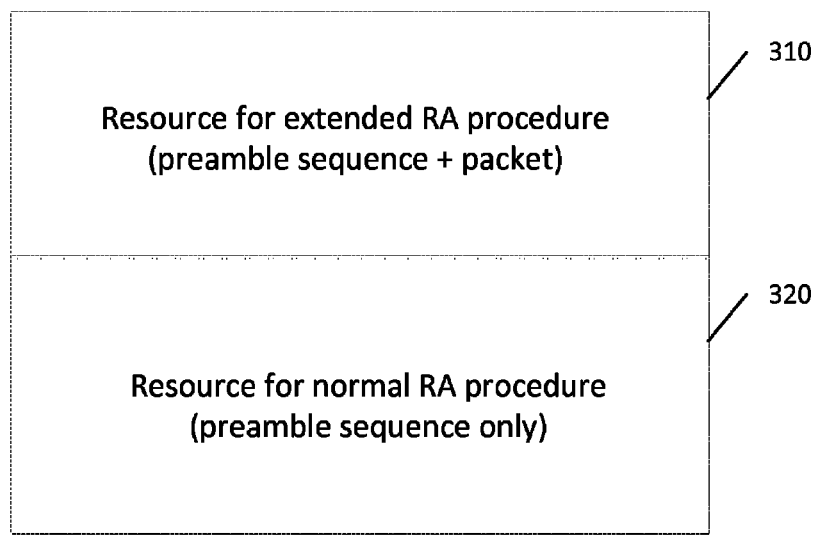
FIG. 3 illustrates example resource partition for normal random access and extended random access procedures, according to certain embodiments.

FIG. 3 illustrates example resource partition for normal random access and extended random access procedures, according to certain embodiments. As shown in FIG. 3, a first partition 310 can include a resource for extended RA procedure, including preamble sequence and packet. The second partition 320 can include a resource for normal RA procedure, including a preamble sequence only. The configuration of the resource allocation can be broadcasted by the eNB and can be dynamically changed.

If notification of a successful delivery of the small packet is required, a simple mechanism can be used for the transmitting (TX) UE to know whether the transmitted packet is received by the eNB or not. To minimize the introduced overhead, a bit map type of acknowledgement can be applied. For example, if there are 10 resources for an extended RA procedure, the eNB can just simply reply a bit map such as {1110010111} with predefined format and resource.

Figure 4:
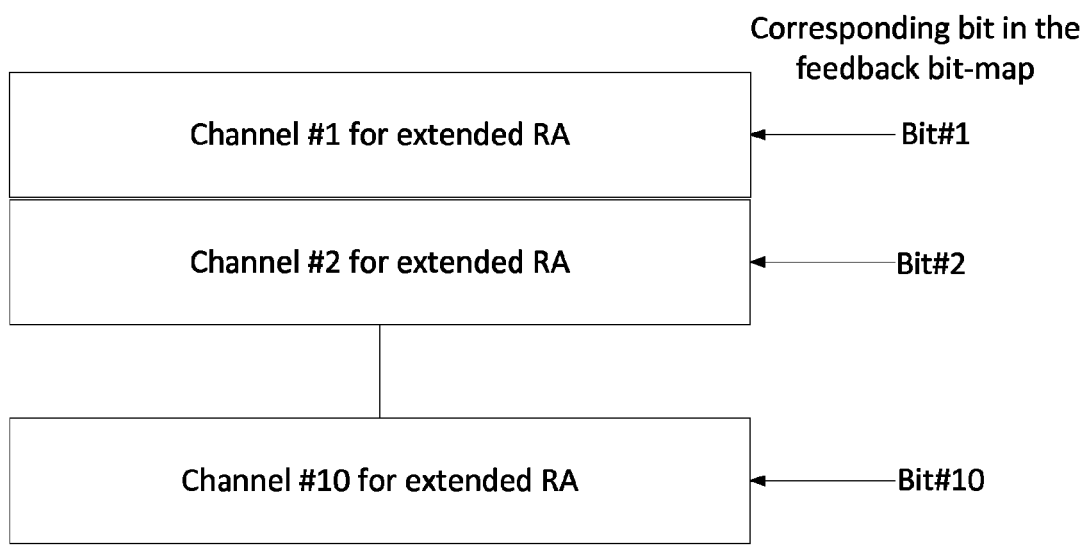
FIG. 4 illustrates an example of extended random access channelization and mapping to feedback bits, according to certain embodiments.

FIG. 4 illustrates an example of extended random access channelization and mapping to feedback bits, according to certain embodiments.

As shown in FIG. 4, a first bit of a bit map can correspond to channel #1 for extended random access (RA). Likewise, a second bit of the bit map can correspond to channel #2 for extended RA. Similarly, each bit can correspond to a channel, until the last bit (for example, bit #10) can correspond to the last channel (for example, channel #10 for extended RA).

After the UE decodes the bitmap, the UE can know whether the transmitted packet has been received correctly or not. If the packet is not correctly received, the packet can be retransmitted in the same way or with a normal RA procedure.

One example of the extended RA procedure is given in FIG. 5. Thus, FIG. 5 illustrates an extended random access procedure for small packet transmission, according to certain embodiments.

As shown in FIG. 5, in a first message, a user equipment can provide an RA preamble sequence with a small packet, to the eNB. In response, the eNB can provide acknowledgment of small packet reception.

Figure 6:
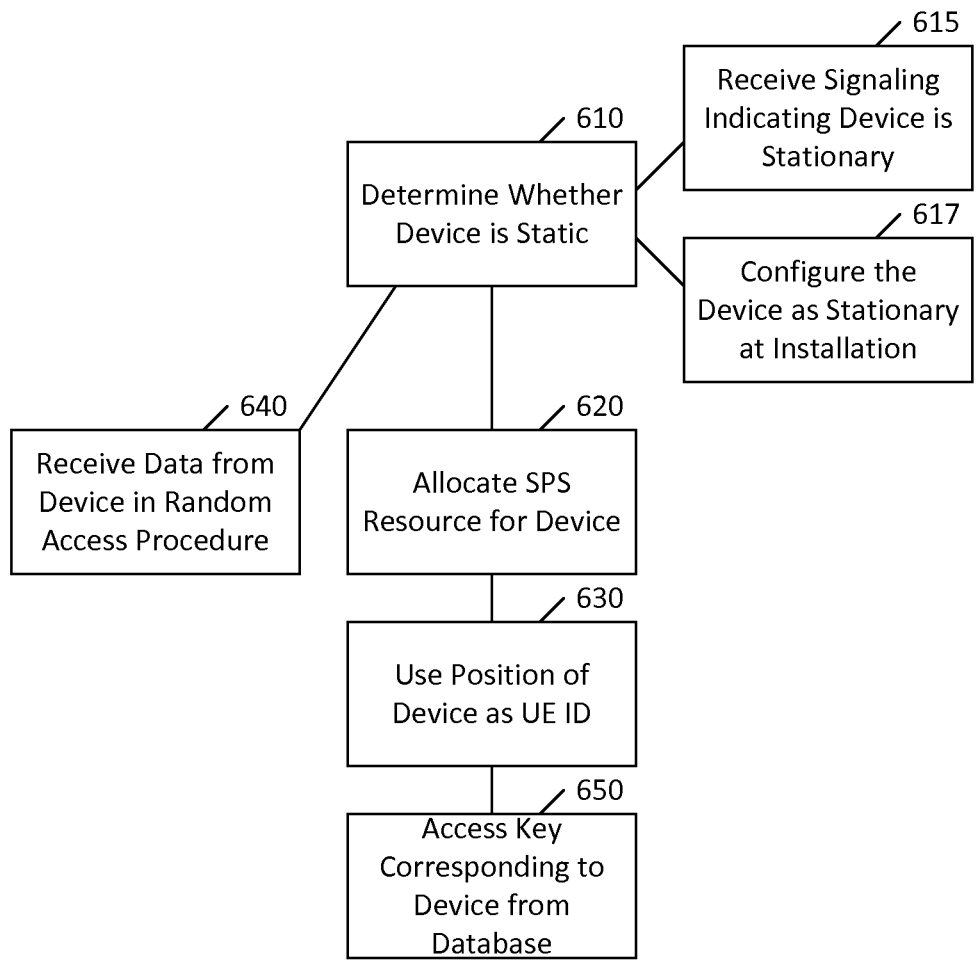
FIG. 6 illustrates a method according to certain embodiments.

FIG. 6 illustrates a method according to certain embodiments. As shown in FIG. 6, a method can include, at 610, determining whether a position of a device is static. The device may be, for example, a user equipment. Various standards can be used to determine whether a device is in a static position. For example, a device can be deemed to be static if its position stays within a predetermined threshold of perfectly still. The predetermined threshold can be set according to a distribution of positions provided by a global positioning system (GPS) for a static device. Alternatively, the predetermined threshold can be set according to a beam width of a pencil beam from an access point to the device. Any threshold can be used, such as a threshold that permits the device to remain stationary while permitting some minute movement, such as vibrations or swaying.

The determining can include determining whether the position of the device is static with respect to an access point. For example, if both the device and the access point are on a train or airplane, both the device and the access point may be moving, but may not be moving relative to one another. This can also be included as an example of a static case, particularly sometimes referred to as a relative static case.

The determination can be made in various ways. For example, the access point can decide for itself that the device is stationary based on determining the location of the device over time. Alternatively, the device send, and the access point can receive at 615, explicit or implicit signaling indicating that the device is stationary. In another alternative, the determining can include, at 617, configuring the device as a stationary device upon installation of the device. For example, a sensor or smart meter can be configured as a stationary device when the sensor or smart meter is installed.

The method can also include, at 620, when the position of the device is determined to be static, allocating at least one semi-persistent resource for a time when the device is in an idle state. The semi-persistent resource can be a resource that is subject to semi-persistent scheduling (SPS).

The at least one semi-persistent resource can be configured to be valid only for a predetermined category of devices. For example, the predetermined category of devices can be static devices.

The allocating can take place either before the device goes to the idle state, as soon as the device goes to the idle state, or after the device has been in the idle state for a predetermined amount of time. The idle state can be a radio resource control idle state.

The method can also include, at 630, using the position of the device as a user equipment identity (UE ID) for the device. Other UE IDs are also permitted, as described above.

The method can further include, at 640, when the position of the device is determined not to be static, receiving data from the device in a message of a random access procedure.

The random access procedure can be an extended random access procedure, as described above. The message can include only a preamble and packet data, but may optionally also include an identification of a user equipment.

The method can additionally include, at 650, accessing a key corresponding to the device from a database based on the identification. The key can be used to secure communication between the device and the access point.

Figure 7:
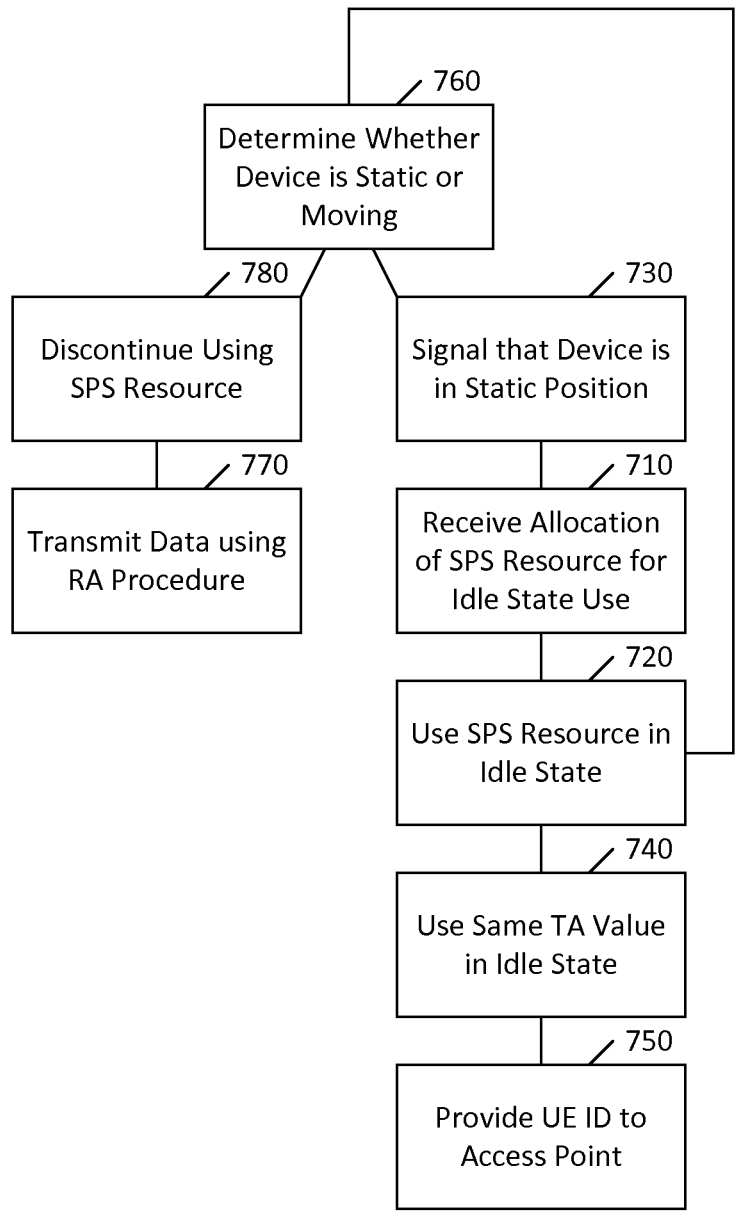
FIG. 7 illustrates another method according to certain embodiments.

FIG. 7 illustrates another method according to certain embodiments. The method of FIG. 7 can be used by a user equipment in coordination with the method of FIG. 6 being used by an access point, such as an evolved Node B (eNB).

As shown in FIG. 7, a method can include, at 710, receiving an allocation of at least one semi-persistent resource for a time when a device is in an idle state. The method can also include, at 720, using the at least one semi-persistent resource when the device is in an idle state. The using the at least one semi-persistent resource can be further contingent on the device being in a static position.

The method can further include, at 730, signaling, explicitly or implicitly, that the device is in a static position. This signaling can be transmitted to an access point. For example, signaling that the device is a smart meter may implicitly indicate to the access point that the device is a static position.

The method can additionally include, at 740, using a same value of timing advance after entering the idle state as immediately before entering the idle state.

The method can also include, at 750, providing a user equipment identity to an access point while the device is in the idle state, wherein the user equipment identity comprises at least one of a location of the device, a static internet protocol address, a temporary mobile subscriber identity, a medium access control address, or a type of sensor. It should be noted that this can be an optional step. For example, in the case of semi-persistent resource allocation, the resource can be allocated upon request from the UE. Given that there is one resource corresponding to one UE, there may be no need to explicitly inform the UE ID to the NW.

The method can also include, at 760, determining whether the device is in a static position or moving. When the device is determined to be moving, the method can further include, at 770, transmitting data from the device in a message of a random access procedure.

Moreover, the using the at least one semi-persistent resource at 720 can be contingent on determining at 760 that the device is in the static position. The method can additionally include, at 780, discontinuing using the at least one semi-persistent resource upon determining that the device is moving.

The determining whether the device is in the static position or moving can be based on a variety of possible mechanisms. For example, the basis can include at least one of a configuration of the device as a stationary device upon installation of the device, measurements of position of the device at a plurality of times, or a measurement of relative speed of a device with respect to a reference point.

Figure 8:
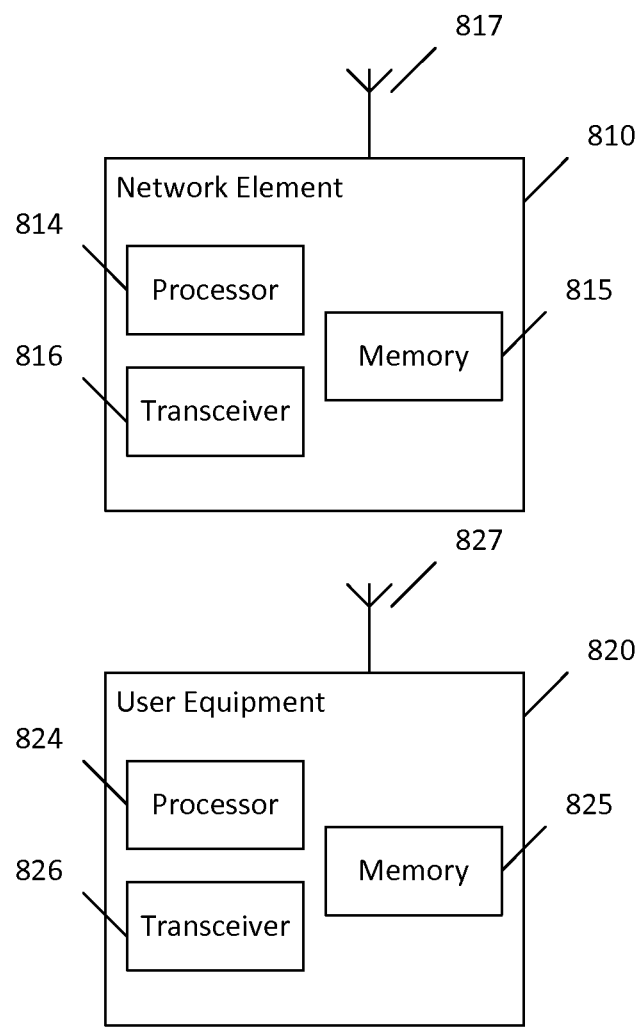
FIG. 8 illustrates a system according to certain embodiments.

FIG. 8 illustrates a system according to certain embodiments of the invention. It should be understood that each block of the flowchart of FIG. 6 or 7 and any combination thereof may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), server, host or any of the other network elements discussed herein. Each of these devices may include at least one processor or control unit or module, respectively indicated as 814 and 824. At least one memory may be provided in each device, and indicated as 815 and 825, respectively. The memory may include computer program instructions or computer code contained therein. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna. Likewise, some network elements 810 may be solely configured for wired communication, and such cases antenna 817 may illustrate any form of wired communication hardware, such as a network interface card.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 820 may be a sensor or smart meter, or other device that may usually be configured for a single location.

In an exemplary embodiment, an apparatus, such as a node or user device, may include means for carrying out embodiments described above in relation to FIG. 6 or 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 1 and 5-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may have various benefits or advantages. For example, certain embodiments may provide an LTE-based, simple, power-efficient scheme for small packet transmission, without requiring an excessive number of changes to the specifications, as a disruptive technology.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary
MN Moving Network
MTC Machine-Type Communications
RA Random access
TA Timing advance
Tx Transmitter/Transmission

We claim:

1. A method, comprising:
receiving an allocation of at least one semi-persistent resource for a time when a device is in an idle state; and
using the at least one semi-persistent resource for data transmission when the device is in the idle state,
wherein when the device is determined to be in a static position with respect to a cell, and while the device is associated with an access point of the cell, the semi-persistent resource is used for the data transmission, and
wherein when the device is determined to be moving in the cell, and while the device is associated with the access point of the cell, data is transmitted from the device in a message of a random access procedure.

2. The method of claim 1, further comprising:
signaling, explicitly or implicitly, that the device is in a static position.

3. The method of claim 1, further comprising:
using a same transmission timing after entering the idle state as immediately before entering the idle state.

4. The method of claim 1, further comprising:
providing a user equipment identity to an access point while the device is in the idle state,
wherein the user equipment identity comprises at least one of a location of the device, a static internet protocol address of the device, a temporary mobile subscriber identity of the device, a medium access control address of the device, or a type of sensor of the device.

5. The method of claim 1, further comprising:
discontinuing using the at least one semi-persistent resource upon determining that the device is moving.

6. The method of claim 1, further comprising:
determining whether the device is in the static position or moving based on at least one of a configuration of the device as a stationary device upon installation of the device, measurements of position of the device at a plurality of times, or a measurement of relative speed of a device with respect to a reference point.

7. The method of claim 1, further comprising:
using an extended random access procedure for small data transmission with a different packet structure for the small data transmission.

8. An apparatus, comprising:
at least one processor; and
at least one memory including computer program code,
wherein the at least one memory and the computer program code are configured to, with the at least one processor, cause the apparatus at least to
determine whether a position of a device is static; and
when the position of the device is determined to be static with respect to a cell, and while the device is associated with the apparatus, allocate at least one semi-persistent resource for data transmission for a time when the device is in an idle state,
wherein the at least one memory and the computer program code are further configured to, with the at least one processor, cause the apparatus at least to, when the position of the device is determined to be moving in the cell, and while the device is associated with the apparatus, receive data from the device in a message of a random access procedure.

9. The apparatus of claim 8, wherein the at least one memory and the computer program code are configured to, with the at least one processor, cause the apparatus at least to determine whether the position of the device is static by determining whether the position of the device is static with respect to an access point.

10. The apparatus of claim 8, wherein the at least one memory and the computer program code are configured to, with the at least one processor, cause the apparatus at least to allocate the at least one semi-persistent resource before the device goes to the idle state.

11. The apparatus of claim 8, wherein the at least one memory and the computer program code are configured to, with the at least one processor, cause the apparatus at least to determine that the position of the device is static by receiving explicit or implicit signaling from the device indicating that the device is stationary.

12. The apparatus of claim 8, wherein the message comprises a preamble and packet data.

13. An apparatus, comprising:
at least one processor; and
at least one memory including computer program code,
wherein the at least one memory and the computer program code are configured to, with the at least one processor, cause the apparatus at least to
receive an allocation of at least one semi-persistent resource for a time when a device is in an idle state; and
use the at least one semi-persistent resource for data transmission when the device is in the idle state,
wherein the at least one memory and the computer program code are configured to, with the at least one processor, cause the apparatus at least to use the at least one semi-persistent resource for the data transmission when the device is determined to be in a static position with respect to a cell, and while the apparatus is associated with an access point, and
wherein the at least one memory and the computer program code are configured to, with the at least one processor, cause the apparatus at least to, transmit data in a message of a random access procedure when the device is determined to be moving in the cell, while the apparatus is associated with the access point.

14. The apparatus of claim 13, wherein the at least one memory and the computer program code are configured to, with the at least one processor, cause the apparatus at least to signal, explicitly or implicitly, that the device is in a static position.

15. The apparatus of claim 13, wherein the at least one memory and the computer program code are configured to, with the at least one processor, cause the apparatus at least to use a same transmission timing after entering the idle state as immediately before entering the idle state.

16. The apparatus of claim 13, wherein the at least one memory and the computer program code are configured to, with the at least one processor, cause the apparatus at least to provide a user equipment identity to an access point while the device is in the idle state, wherein the user equipment identity comprises at least one of a location of the device, a static internet protocol address of the device, a temporary mobile subscriber identity of the device, a medium access control address of the device, or a type of sensor of the device.

17. The apparatus of claim 16, wherein when the device is static, location of the device is used for the user equipment identity.

18. The apparatus of claim 16, wherein when the device is moving, the static internet protocol address of the device, the temporary mobile subscriber identity of the device, the medium access control address of the device, or the type of sensor of the device is used for the user equipment identity.

19. The apparatus of claim 13, wherein the at least one memory and the computer program code are configured to, with the at least one processor, cause the apparatus at least to determine whether the device is in the static position or moving based on at least one of a configuration of the device as a stationary device upon installation of the device, measurements of position of the device at a plurality of times, or a measurement of relative speed of a device with respect to a reference point.

20. The apparatus of claim 13, wherein the at least one memory and the computer program code are configured to, with the at least one processor, cause the apparatus at least to use an extended random access procedure for small data transmission with a different packet structure for the small data transmission.

* * * * *